June 23, 1959     R. J. CHAMBERLAIN     2,891,878
ANTISTATIC POLYMERIC COATINGS
Filed April 11, 1955
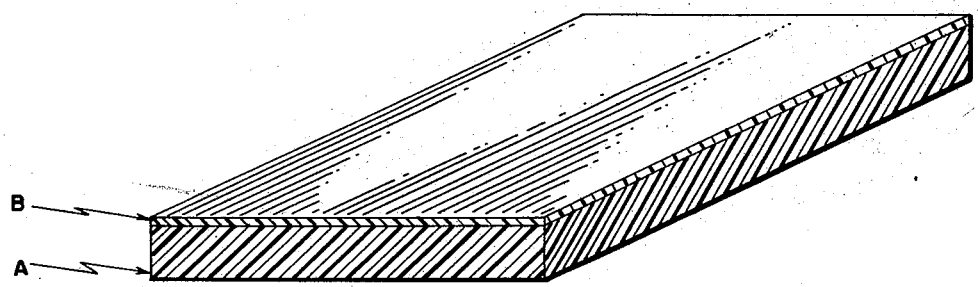
A = METHYL METHACRYLATE BASE.
B = WATER-INSOLUBLE TRANSPARENT FILM OF
HARDENED POLYSTYRENE CONTAINING 0.4% OF
STEARAMIDOPROPYLDIMETHYL-β-HYDROXYETHYL-
AMMONIUM DIHYDROGEN PHOSPHATE.
INVENTOR.
RALPH J. CHAMBERLAIN
BY
ATTORNEY

United States Patent Office 2,891,878
Patented June 23, 1959

2,891,878
ANTISTATIC POLYMERIC COATINGS

Ralph J. Chamberlain, Stamford, Conn., assignor to American Cyanamid Company, New York, N.Y., a corporation of Maine Application April 11, 1955, Serial No. 500,643

2 Claims. (Cl. 117—138.8)

This invention relates to the treatment of shaped articles to prevent or lessen their normal tendencies to accumulate static charges of electricity thereon. More specifically, the present invention relates to the minimizing of the accumulation of static charges on articles that are coated or impregnated with water-insoluble transparent polymeric finishes and to the resulting articles.

Many shaped articles normally develop or tend to develop electrostatic charges upon their surfaces when they are subjected to friction during their production and finishing or during their handling and use thereafter. Various treatments have hitherto been attempted in efforts to minimize such electrostatic charge accumulations but, notwithstanding the fact that a few of these treatments have met with some varying success, none has been entirely satisfactory with regard to the cost of the treatment, the efficacy thereof and particularly the durability of the desired effect.

One of such treatments, for example, has comprised the incorporation of an anti-static agent in the raw material which is to be processed or fabricated into the shaped article. Such a treatment, although capable of developing a durable anti-static product is costly and wasteful of the anti-static agent buried within the article where it is incapable of asserting its full anti-static properties and characteristics. Such a treatment is more fully described in copending application, Serial No. 404,785, filed January 18, 1954, and reference thereto is incorporated herein.

Another method has involved the manufacture of the shaped article itself, followed by its being coated or impregnated with an anti-static agent. Such a method naturally decreased the cost of the anti-static treatment inasmuch as the treating agent, being present only on the surface of the shaped article, could be used in smaller amounts. Such an anti-static finish, however, was not permanent inasmuch as the anti-static finish quickly washed or wore off and the advantages thereof were not long-lived. Such a method is more fully described in U.S. Patent 2,626,876, issued January 27, 1953, and reference thereto is incorporated herein.

It is therefore a principal purpose of the present invention to provide methods of permanently preventing the electrostatic charge accumulations on shaped articles by means of improved water-insoluble, transparent, synthetic polymeric finishes which are inexpensive, efficacious and particularly durable.

It has been discovered that these shaped articles may be given such a durable, relatively static-free transparent finish by dissolving a small amount of an anti-static quaternary ammonium compound and a compatible synthetic polymeric plastic finishing material in a suitable volatile solvent applying such a solution to the shaped objects and then removing the solvent to leave the desired water-insoluble transparent finish on the article.

The anti-static quaternary ammonium compounds may be represented by the general formula

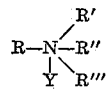

wherein R is an aliphatic or alicyclic radical and, more particularly, an alkyl or alkylamidoalkyl radical containing at least 4 carbon atoms; R' and R" are alkyl or hydroxyalkyl radicals having from 1 to carbon atoms or a polyalkenoxy radical having the formula $-(C_2H_4O)_mH$ wherein $m$ is from 2 to about 200; R''' is an aralkyl radical or a hydroxyalkyl radical having from 1 to 3 carbon atoms or a polyalkenoxy radical having the formula $-(C_2H_4O)_mH$ wherein $m$ is from 2 to about 200; and Y is an anion.

Illustrative examples of radicals represented by R are heptyl, octyl, nonyl, decyl, undecyl, tridecyl, heptadecyl, abietyl, stearamidopropyl, acetamidopropyl, caprylamidopropyl, lauramidopropyl, abietamidopropyl, etc.; illustrative examples of R' and R" are methyl, ethyl, propyl, isopropyl, hydroxyethyl, hydroxypropyl, dihydroxypropyl, etc., as well as the indicated polyalkenoxy radicals and particularly a polyethenoxy radical; illustrative examples of R''' are hydroxyethyl, hydroxypropyl, dihydroxypropyl, benzyl, etc.; as well as the indicated polyalkenoxy radicals and particularly a polyethenoxy radical; and illustrative examples of anions represented by Y are chlorine, bromine, fluorine, iodine, sulfate, sulfonate, sulfite, bisulfite, sulfide, phosphate, dihydrogen phosphate, hydroxide, borate, carbonate, nitrite, nitrate, acetate and other inorganic and organic anions.

The amount of the anti-static quaternary ammonium compound in the transparent synthetic polymeric finishing material may be varied within wide limits and may range from about 0.1% to about 10% by weight based on the weight of the finishing material carrying the same. Within the more specific commercial aspects of the present invention, the anti-static agent may range from about 0.5% to about 5% by weight of the finishing material.

The compatible synthetic polymeric finishing material in which the anti-static agent is incorporated may be selected from a wide field of water-insoluble transparent synthetic ploymeric finishes. Such particularly includes finishes formed from materials containing a $CH_2=C<$ bond such as the acrylic ester resin such as the acrylate and methacrylate polymers and copolymers; the vinyl polymers such as polyvinyl chloride, polyvinyl acetate, polyvinyl butyral, polyvinyl chloride-acetate, vinyl chloride-vinylidene chloride; the polyethylene polymers such as polyethylene, polyhalogenated ethylenes, polystyrene and the styrenated alkyds; etc.

Other finishes suitable for application of the present invention include thermosetting as well as other thermoplastic materials. Illustrative of such materials are: The alkyd resins including the modified alkyds and the terpenic and maleic alkyds; the amino resins including urea- formaldehyde and melamine-formaldehyde; the protein plastics including casein, zein, keratin, peanut and soyabean plastics; the cellulosics including cellulose acetate, cellulose nitrate, cellulose acetate butyrate, regenerated cellulose, lignocellulose, ethyl cellulose, hydroxyethyl cellulose and carboxymethyl cellulose; the epoxy resins; the ethylene and fluoroethylene polymers; the furan resins; the polyamides; the phenolics including phenol-formaldehyde, phenol-furfural and resorcinol-formaldehyde, the polyester resins including the saturated polyesters, the unsaturated polyesters and the polyfunctional unsaturated esters and the silicones.

It is essential, of course, that the anti-static agent be compatible with these synthetic polymeric materials and that the resulting finishing material be incapable of harming or undesirably affecting the nature or properties and characteristics of the shaped article. This is particularly true with regard to the clearness and transparency of such finishes in order that they do not detract from the finish of the shaped article.

The coating composition may be made up by dissolving, dispersing or otherwise bringing the anti-static agent and the plastic finishing material into a fluid or plastic condition, and then combining or mixing the two to create substantial homogeneity or uniformity and adding any other desired constituents. During this dissolving or dispersing procedure the presence of water is to be avoided in order to eliminate cloudiness or lack of transparency in the resulting coating. All materials therefore should be anhydrous or substantially anhydrous. This fluid or plastic mix may then be applied, as desired or required, by spraying, padding, brushing, dipping, or the like, and then drying the same, as by air-drying or by heat or bake drying, when required.

The shaped articles employed in the application of the present invention comprise any article of manufacture susceptible to the accumulation of static electricity and would include such products as clock, radio and television cases; office equipment housings, large showcase and display pieces, hospital equipment particularly in operating rooms, wheels and gears, automobile and household seat covers, textile guides, aircraft observation noses and bubbles, playing cards, telephone equipment, dome skylights, hose, flexible tubing, belts, phonograph records, clothes lines, and the like, and especially articles to be used in locations where static electricity discharges would be dangerous as in powder and explosive magazines.

The composition of such shaped articles is limited to those possessing tendencies to accumulate static charges and include glass, leather, paper, textiles, and thermoplastic or thermosetting materials such as mentioned above and particularly the acrylate and methacrylate resins; the vinyl polymers such as polyvinyl alcohol, polyvinyl chloride, polyvinyl acetate, polyvinyl chloride-acetate, vinyl chloride-vinylidene chloride, polyvinyl butyral; polyacrylonitrile and thermoplastic copolymers of acrylonitrile; styrene and methylstyrene resins; and others containing a $CH_2=CH<$ bond.

The attached drawing illustrates, as an example of a shaped article illustrative of the invention, a panel of methyl methacrylate carrying a surface coating of a vinyl plastic in which a cationic anti-static agent is dissolved. On the drawing reference character A designates the methyl methacrylate square hereinafter described in Example 1 and B designates a water-insoluble transparent film of hardened polystyrene plastic containing the cationic anti-static agent, the coating having been prepared and applied as is also described in Example 1.

The invention will be further illustrated in more specific detail by the following tests and related examples. It should be understood, however, that although these tests and examples may describe in more particular detail some of the very specific features of the invention, they are given primarily for purposes of illustration and the invention in its broader aspects is not to be construed as limited thereto.

In these examples, reference will be made to a carbon black anti-static test. This test comprises a simple method for assigning an anti-static rating to an agent when applied to a shaped article such as a fabric, rod, film or the like. Essentially, the rating is relative and represents the number of inches which the shaped article will attract carbon black beads such as Carbon Black EPC (Easy Processing Channel Black) vertically after the shaped article has been stroked rapidly and firmly ten times with a glass rod (or a long lead pencil, a plastic rod or the like). A perfect reading is zero inches rise and an excellent reading is obtained when there is substantially no rise. Readings are relatively graded through fair, poor, bad and very bad with readings ranging up to four or five inches. Because of the rapid dissipation of the electrostatic charge from the test piece, several tests are run and only a few seconds are allowed for stroking and reading the height of carbon black movement.

Example 1

To 237.5 grams of a 20% solution of polystyrene in benzene was added 25 grams of a 10% solution of "Cationic SP" (stearamidopropyldimethyl-B-hydroxyethylammonium dihydrogen phosphate) in butyl Cellosolve (approximately 5.3% by weight of SP based on weight of polystyrene). The resulting mix (substantially-free of water) was flowed on to a methyl methacrylate square (3 grams of the mix on a 4" x 4" square) and hardened to a water-insoluble transparent film thereon. 21 squares were prepared and tested for anti-static properties on the same day when prepared, using the carbon black test, previously described. Excellent results were obtained in substantially every case. Blanks containing no anti-static agent give bad results with rises up to 3–4 inches. The samples were then stored at 50% relative humidity and room temperature. Three samples were selected after 24 hours' storage and washed thoroughly with soap and water and then restored. Three additional samples were selected after 5 days' storage and washed thoroughly with soap and water.

All samples were tested at 5 days and 7 days for anti-static properties and found to be excellent in practically every case. Blanks run with no SP gave bad results (rises of 3–4 inches).

All samples were tested after 7 additional days at 70° C. for stability of anti-static properties. When tested while still hot, fair results were obtained; when tested after cooling 18 hours at 50% relative humidity, excellent results were obtained. Blanks run with no SP gave bad results.

The six selected samples which had been washed with soap and water showed no decrease in anti-static properties, gave excellent results and demonstrated the durability and stability of such desirable characteristics. Blanks run without any anti-static agent failed after the washings and gave bad to very bad results (rises up to 4 inches).

Example 2

The procedures set forth in Example 1 were carried out substantially as described therein with the exception that SP was replaced by: (1) caprylamidopropyldimethyl-B-hydroxyethylammonium chloride; (2) octadecyldimethyl-B-hydroxyethylammonium chloride; (3) octyldimethyl-B-hydroxyethylammonium chloride and (4) stearamidopropyldimethylbenzylammonium chloride. The results of the carbon black tests were uniformly good to excellent whereas the blanks which did not contain any antistatic agents ranged from poor to bad.

Example 3

The procedures set forth in Example 1 were carried out substantially as described therein with the exception that shaped articles of different compositions were used. In this example, square rods approximately one-half inch square by ten inches long were used. The rods were made of: (1) cellulose acetate; (2) phenol formaldehyde; (3) urea formaldehyde; (4) melamine formaldehyde; (5) polyacrylonitrile; (6) acrylonitrile-vinyl acetate-2-methyl-5-vinyl pyridine (85–7.5–7.5); and (7) ethyl cellulose. In all cases employing SP in the polystyrene plastic finishing materials, the carbon black tests were substantially all excellent whereas those blanks omitting the SP ranged from poor to bad.

Example 4

To 25% solutions of polystyrene in benzene were added various graded amounts of (1) "Cationic SP," (2) "Aerosol SE" (stearamidopropyldimethyl-B-hydroxyethylammonium chloride), and (3) (4) (5) "Aerosol SE" with 15, 159 and 207 moles of ethylene oxide added thereto. The three groups of compounds with ethylene oxide were added in benzene solution substantially free from water, whereas the SP and SE were added in butyl Cellosolve solution also substantially free from water. The polystyrene-anti-static mix was flowed onto 4" x 4" methyl methacrylate squares and allowed to harden to water-insoluble transparent films. Carbon black tests were run with the following results:

All five anti-static agents tested at a concentration of 6% by weight based on the total weight of polystyrene gave excellent results at 72 hours. Blanks run with no anti-static agent gave fair to poor results.

All five anti-static agents tested at the graded concentrations were tested for stability and durability by being washed thoroughly with soap and water at 72 hours storage, then dried and rewashed with soap and water, and finally aged at 50% relative humidity at room temperature for 14 days. All results were verified by being repeated. The results were as follows:

| Agent | Concentration, percent | Result |
|---|---|---|
| SP | 6 | Excellent. |
| SP | 1 | Do. |
| Blank | | Bad. |
| SE | 6 | Excellent. |
| SE | 1 | Do. |
| Blank | | Bad. |
| Se (15 E.O.) | 6 | Excellent. |
| SE (15 E.O.) | 2 | Do. |
| SE (15 E.O.) | 1 | Do. |
| Blank | | Bad. |
| SE (159 E.O.) | 6 | Excellent. |
| SE (159 E.O.) | 5 | Do. |
| SE (159 E.O.) | 4 | Do. |
| SE (159 E.O.) | 3 | Do. |
| Blank | | Bad. |
| SE (207 E.O.) | 6 | Excellent. |
| SE (207 E.O.) | 5 | Do. |
| SE (207 E.O.) | 4 | Do. |
| SE (207 E.O.) | 3 | Do. |
| Blank | | Bad. |

Example 5

The anti-static properties of SP in several plastic materials were demonstrated by the following carbon black tests carried out with glass as the shaped article.

A 10% solution of SP in "Dowanol 37B" (propylene glycol-n-butyl ether) was prepared as the anti-static agent. For the plastic carrying material, (1) a 10% solution of methyl methacrylate was prepared by granulating sheet material and dissolution in ethylene dichloride; (2) a 20% solution of "Vinylite VYHH" (copolymerized 87% vinyl chloride and 13% vinyl acetate resin) was prepared by dissolution in acetone; and (3) a 20% solution of polystyrene was prepared by dissolution of polystyrene beads in benzene.

These tests were run at 16% relative humidity and room temperature to impose more severe conditions on the evaluation procedures.

3% and 5% solutions (w./w.) of SP were prepared in the indicated plastic materials and then poured on 4" x 4" glass plates and drawn into a thin 0.003" film by a doctor blade, hardening to a water-insoluble, transparent coating. Carbon black tests were carried out after 16 hours and 40 hours; after 112 hours, the glass plates and coatings thereon were washed thoroughly with soap and water, dried and tested again. As a final test, the relative humidity was reduced to 14% relative humidity for an additional 24 hours and the pieces tested again. All results were excellent. Blanks were run with the plastic material without any SP and test results ranged from bad to very bad.

Example 6

The procedures of Example 5 were carried out substantially as set forth therein with additional plastic materials being used to carry the anti-static agent (SP). Such plastic polymeric materials included (1) cellulose acetate dissolved in acetone; (2) cellulose nitrate dissolved in butanol; (3) polyethylene dissolved in benzene at elevated temperatures; and (4) polyacrylonitrile dissolved in dimethyl formamide. The carbon black testing results were uniformly excellent whereas the blanks which did not contain any SP ranged from bad to very bad.

Consideration of these examples will bring out clearly the great improvement in durability of the anti-static properties of the shaped articles treated by the methods of the present invention. Their excellent properties of not accumulating static charges are developed immediately and survive thorough handling and washing with soap and water whereas other products not so treated have failed and given bad to very bad results.

Although I have described specific examples of my inventive concept, I consider the broad aspects of the same not to be limited to the specific substances mentioned therein but to include various other compounds of equivalent function and constitution as set forth in the claims appended hereto. It is understood that any suitable changes, modifications and variations may be made without departing from the spirit and scope of the invention.

What I claim is:

1. A shaped solid vinyl plastic article carrying an adherent anti-static surface film of a hardened, transparent, water-insoluble polymeric plastic containing uniformly distributed therethrough from about 0.1% to 10% of its weight of a water-soluble anti-static agent of the class hereinafter defined and having a permanently reduced capacity for accumulating static charges of electricity by virtue of said film thereon, said anti-static agent having the formula

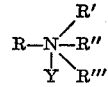

wherein R is a member of the group consisting of alkyl and alkylamidoalkyl radicals containing at least 4 carbon atoms, R' and R" are members of the group consisting of alkyl and hydroxyalkyl radicals having from 1 to 3 carbon atoms and polyalkenoxy radicals having the formula —$(C_2H_4O)_m$H wherein $m$ is from 2 to about 200, R''' is a member of the group consisting of aralkyl radicals, hydroxyalkyl and alkyl radicals having from 1 to 3 carbon atoms and polyalkenoxy radicals having the formula —$(C_2H_4O)_m$H wherein $m$ is from 2 to about 200, and Y is an anion.

2. A shaped article as defined in claim 1 wherein the anti-static agent is stearamidopropyldimethyl-B-hydroxyethylammonium dihydrogen phosphate.

References Cited in the file of this patent

UNITED STATES PATENTS

| 2,626,876 | Carnes | Jan. 27, 1953 |
| 2,626,877 | Carnes | Jan. 27, 1953 |
| 2,694,688 | Hughes | Nov. 16, 1954 |